United States Patent
Miyagawa et al.

(10) Patent No.: US 6,683,836 B2
(45) Date of Patent: Jan. 27, 2004

(54) LASER CONTROL DEVICE

(75) Inventors: Satoshi Miyagawa, Niihama (JP); Kazuo Manabe, Saijo (JP); Norio Imai, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 18 days.

(21) Appl. No.: 09/958,342
(22) PCT Filed: Feb. 9, 2001
(86) PCT No.: PCT/JP01/00920
§ 371 (c)(1), (2), (4) Date: Dec. 5, 2001
(87) PCT Pub. No.: WO01/59777
PCT Pub. Date: Aug. 16, 2001

(65) Prior Publication Data
US 2002/0159364 A1 Oct. 31, 2002

(30) Foreign Application Priority Data
Feb. 9, 2000 (JP) ........................................ 2000-032208

(51) Int. Cl.$^7$ ............................................... G11B 7/00
(52) U.S. Cl. .................. 369/53.26; 369/116; 369/47.53
(58) Field of Search ................................ 369/120, 121, 369/122, 116, 53.26, 47.5, 47.51, 47.52, 47.53, 47.55

(56) References Cited

U.S. PATENT DOCUMENTS 4,509,156 A * 4/1985 Ohara et al. ................. 369/116
4,558,441 A    12/1985 Yokota et al.
6,400,673 B1   6/2002 Shigemori

FOREIGN PATENT DOCUMENTS

| JP | 63-291225 | 11/1988 |
| JP | 64-48240  | 2/1989  |
| JP | 1-204224  | 8/1989  |
| JP | 2-68736   | 3/1990  |
| JP | 7-111783  | 3/1990  |
| JP | 2-287930  | 11/1990 |
| JP | 4-168633  | 6/1992  |
| JP | 6-338073  | 12/1994 |
| JP | 7-147446  | 6/1995  |
| JP | 11-16189  | 1/1999  |
| JP | 11-016189 | 1/1999  |
| JP | 11-185275 | 7/1999  |

* cited by examiner

*Primary Examiner*—Nabil Hindi
(74) *Attorney, Agent, or Firm*—Wenderoth, Lind & Ponack, L.L.P.

(57) ABSTRACT

When the modulation speed of the laser is increased, it is difficult to correctly detect a peak power and a bias power for controlling a laser power. The bias power current Ib is controlled by the operated value of the operation circuit 3 in accordance with the reproduction power current Ir control value of the servo amplifier 5 at the reproduction just before recording, and as for the erase power Pe, since its period is relatively long, the power is detected by the sample-hold circuit 4 and the erase power current Ie is controlled by the operation circuit 3, and the peak power PP is controlled by the operated value of the operation circuit 3 in accordance with the erase power current Ie, and therefore, a bottom hold circuit and a peak hold circuit are not required and the laser control apparatus which does not require the high-speed performance in a photodiode and a monitor circuit is realized to solve the above mentioned problem.

2 Claims, 7 Drawing Sheets

LASER CONTROL DEVICE

TECHNICAL FIELD

The present invention relates to a laser control apparatus, more particularly, an apparatus which carries out power control of a semiconductor laser employed for an optical recording/reproducing apparatus, and can control the optical power stably even when an output light is modulated at high speed at the high-speed recording.

BACKGROUND ART

A semiconductor laser is generally employed as an optical pick up and the like in an optical recording/reproducing apparatus such as a CD player, a writable CD-R drive, an erasable CD-RW drive and the like. The power of a semiconductor laser varies greatly in accordance with a temperature change or changes with passage of time(lifetime), and therefore, it is necessary to carry out power control for stabilizing the power when employing a semiconductor laser as a light source in an apparatus for performing recording/reproduction into/from an optical recording medium such as an optical disk and the like.

Such prior art semiconductor laser power control apparatus is disclosed in Japanese Published Patent Application No. Hei. 1-204224 in detail.

Figure 9:
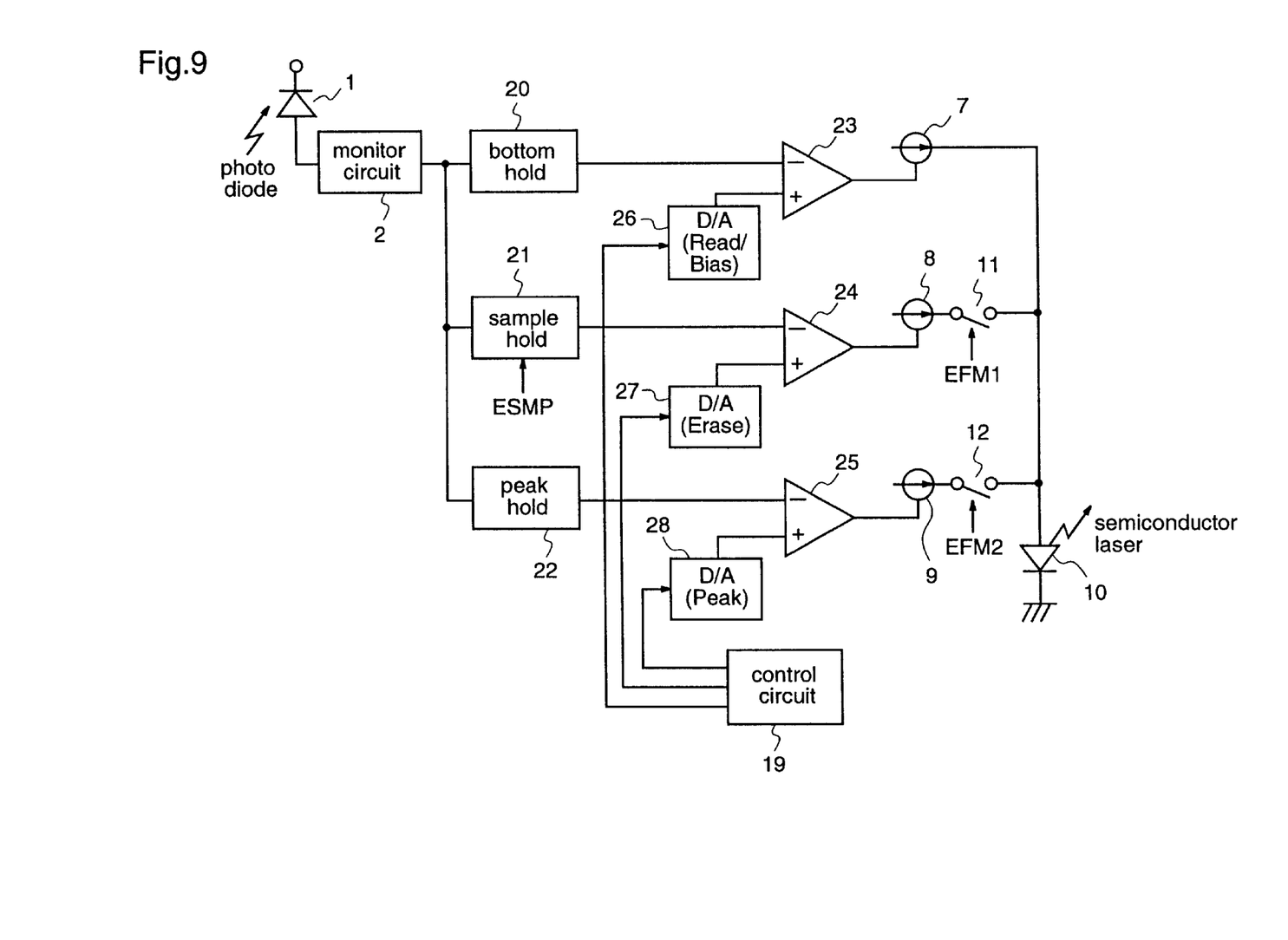
FIG. 9 is a block diagram of a conventional laser control circuit.

FIG. 9 is a block diagram for illustrating a prior art semiconductor laser power control apparatus. In figure, numeral 10 denotes a semiconductor laser for radiating laser light to an optical disk; numeral 1 denotes a photodiode for receiving the irradiation light of the semiconductor laser 10; numeral 2 denotes a monitor circuit for monitoring the output of the photodiode 1; numeral 20 denotes a bottom hold circuit for holding a bottom level of the output from the monitor circuit 2; numeral 21 denotes a sample-hold circuit for sample-holding the output from the monitor circuit 2; numeral 22 denotes a peak hold circuit for holding a peak level of the output from the monitor circuit 2; numeral 19 denotes a control circuit for outputting a first, a second and a third digital signals corresponding to a bias reference voltage, an erase power reference voltage and a peak power reference voltage, respectively; numeral 26 denotes a D/A converter for converting the first digital signal outputted by the control circuit 19 to a bias reference voltage; numeral 27 denotes a D/A converter for converting the second digital signal outputted by the control circuit 19 to an erase reference voltage; numeral 28 denotes a D/A converter for converting the third digital signal outputted by the control circuit 19 to a peak power reference voltage; numeral 23 denotes a servo amplifier for comparing the bias reference voltage outputted by the D/A converter 26 with the bottom level which is held in the bottom hold circuit 20 to amplify the error; numeral 24 denotes a servo amplifier for comparing the erase reference voltage outputted by the D/A converter 27 with a sample-hold level which is held in the sample-hold circuit 21 to amplify the error; numeral 25 denotes a servo amplifier for comparing the peak power reference voltage outputted by the D/A converter 28 with the peak hold level which is held in the peak hold circuit 22 to amplify the error; numerals 7,8 and 9 denote current sources for generating the currents corresponding to the outputs of the servo amplifiers 23,24 and 25, respectively; numeral 11 denotes a switch means for disconnecting the current source 8 with the semiconductor laser 10 in accordance with data EFM1; numeral 12 denotes a switch means for disconnecting the current source 9 with the semiconductor laser 10 in accordance with data EFM2.

Next, the operation will be described. A portion of the output light from the semiconductor laser 10 is received by the photodiode 1 and the generated photoelectric current is converted to a voltage in the monitor circuit 2.

At reproduction from the optical disk, the reproduction power reference voltage VR which is outputted by the D/A (Read/Bias) converter 26 serving as a reference voltage source and a voltage which is obtained by the bottom hold circuit 20 by sample-holding the output of the monitor circuit 2 are compared by the servo amplifier 23 and a current is passed through the semiconductor laser 10 by the current source 7 which is controlled by the comparison result of servo amplifier 23 so that a reproduction power PR corresponding to the reproduction power reference voltage VR is constantly outputted.

Figure 2:
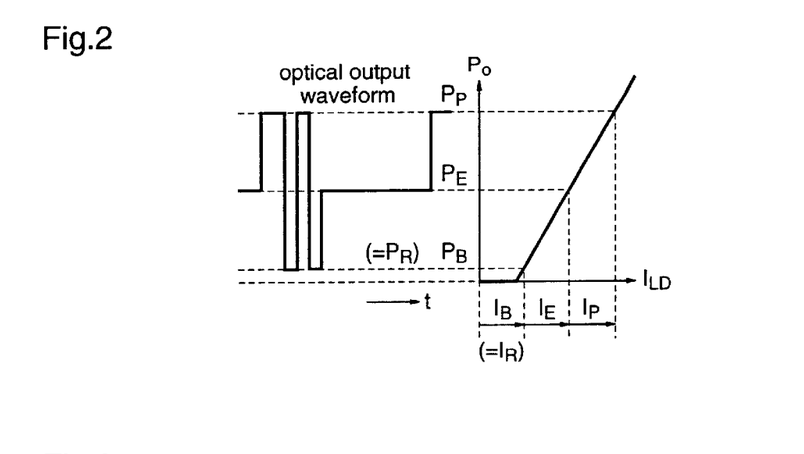
FIG. 2 is a diagram for explaining a relation between a current and an optical output of a laser.

At recording into an optical disk, as shown in FIG. 2, the power of the semiconductor laser 10 is modulated into the three values of bias power PB, erase power PE, and peak power PP, thereby recording is performed into the optical disk. Then, a portion of the output light from the semiconductor laser 10 is received by the photodiode 1, and a signal corresponding to the optical output is outputted from the monitor circuit 2. The signal from the monitor circuit 2 is held by the bottom hold circuit 20, the sample-hold circuit 21, and the peak hold circuit 22 respectively, and the bottom level, the erase level and the peak level of the optical output are detected respectively. Initially, the bias power PB can be obtained by switching the output of the D/A (Read/Bias) converter 26 serving as a reference voltage source in FIG. 9 to switch over from the VR to the bias power reference voltage VB corresponding to the bias power PB. The bias power reference voltage VB and the voltage which is held in the bottom hold circuit 20 are compared by the servo amplifier 23, and a current is passed through the semiconductor laser 10 by the current source 7 which is controlled by the comparison result of servo amplifier 23 so that the bias power PB corresponding to the bias power reference voltage VB is constantly outputted.

Next, the erase power PE is obtained by comparing the erase power reference voltage VE outputted by the D/A (Erase) converter 27 serving as a reference voltage source and the output from the sample-hold circuit 21 by the servo amplifier 24 and by passing an erase power current through the semiconductor laser 10 with the erase power current superposed on the bias power current by the current source 8 which is controlled by the comparison result of servo amplifier 24.

Further, the peak power PP is obtained by comparing the peak power reference voltage VP outputted by the D/A (Peak) converter 28 serving as a reference voltage source and the output from the peak hold circuit 22 by the servo amplifier 25 and by passing a peak power current through the semiconductor laser 10 with the peak power current further superposed on the erase power current by the current source 9 which is controlled by the comparison result of servo amplifier 25.

Figure 3:
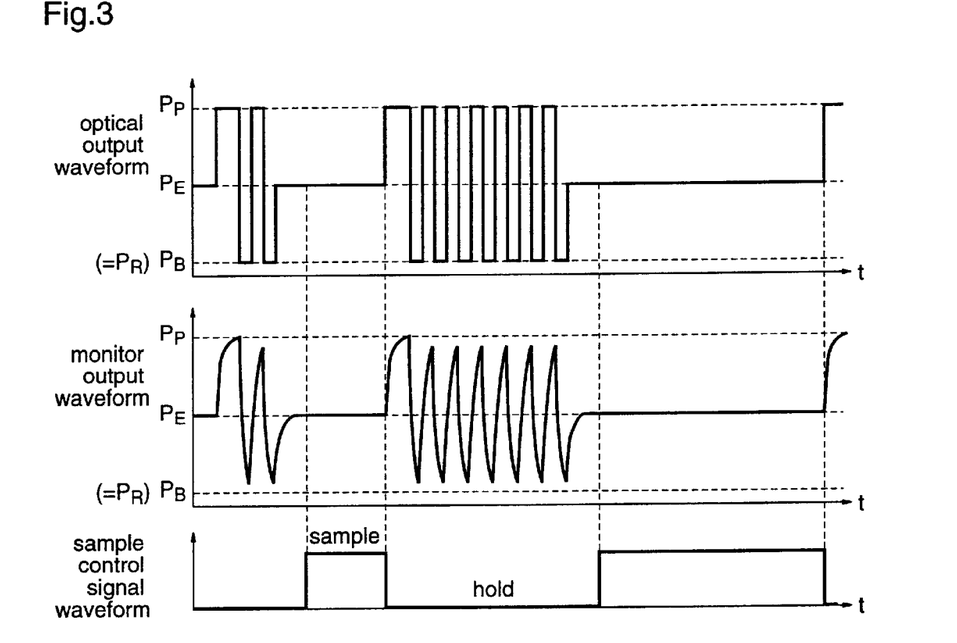
FIG. 3 are diagrams for explaining the operation of the laser control apparatus according to the first embodiment of the present invention.

Meanwhile, the erase power PE and the peak power PP are turned on and off by the switch means 11 and 12 which are switched by data EFM1 and EFM2, respectively, and therefore the power of the semiconductor laser is modulated between the bias power PB, the erase power PE and the peak power PP. As shown in FIG. 3, the interval at which the modulation is performed between the bias power PB and the peak power PP is the interval at which pits are formed on the track, and when the switch means 11 and 12 are in the state of on and off, respectively, the intervals at which the value of the erase power PE is maintained are the intervals where the space between pits are erased and spaces are formed. The three power values (the value of the bias power PB, the value of the erase power PE, and the value of the peak power PP) can obtain the desired power values by changing the respective reference voltages of D/A converters 26, 27 and 28 serving as the reference voltage sources.

The conventional semiconductor laser power control apparatus is constructed as above, and it can perform such a control that the powers of peak and bottom of the semiconductor laser should be predetermined by detecting the powers of peak and bottom of the semiconductor laser.

By the way, in a CD-R drive, a CD-RW drive or the like, the recording of data into an optical disk is performed at high speed by such as so-called double-speed recording which performs recording of data at an average rotation speed which amounts to N times (N is an integer of 2 or above) of the reproduction rotation speed of a music CD player as a reference, thereby, it is necessary to increase the modulation speed of the laser to a higher one, and for controlling the laser power at such high-speed modulation, the conventional construction requires to detect the bias power PB, the erase power PE, and the peak power PP, respectively, and therefore a monitor circuit, a bottom hold circuit, and a peak hold circuit which can perform high-speed responses are required, thereby resulting in an increase in costs.

That is, even when the laser is modulated at high speed and the high speed modulated light is incident on a monitor photodiode, if a photodiode and a monitor circuit having low response speeds are used, delays or unsharpening of signals would be generated therein and unsharpening of a monitor output signal would also occur, and therefore, as shown in FIG. 3, the optical output waveform cannot be correctly reflected on the monitor output and even if an output signal of the monitor circuit has become of high speed, as the signal becomes of higher speed, the detection efficiency of the bottom hold circuit and the peak hold circuit are lowered, thereby making it difficult that the peak output level and the bias output level should be detected correctly. In addition, in order to avoid these problems, it is required for a monitor circuit, a bottom hold circuit, and a peak hold circuit to have the capability of high-speed response, thereby resulting in an increase in costs.

The present invention is made to solve the above-mentioned problems and has for its object to provide a laser control apparatus which can perform a stable power control even at a high-speed modulation even though employing a monitor photodiode and a monitor circuit which operate at a relatively low speed.

DISCLOSURE OF INVENTION

According to Claim 1 of the present invention, there is provided a laser control apparatus which controls a power of a semiconductor laser in an optical recording/reproducing apparatus for performing recording/reproduction into/from an optical recording medium by a semiconductor laser, comprising: a reproduction power monitor means for monitoring an output of the semiconductor laser at reproduction just before recording; a bias power setting means for setting a bias power which is a minimum power outputted by the semiconductor laser at recording of pits into the optical recording medium, to a semiconductor laser driving means on the basis of a monitor value of the reproduction power monitor means; an erase power monitor means for monitoring an erase power which is a power outputted by the semiconductor laser at erasing between pits of the optical recording medium by sample-holding; an erase power setting means for setting the erase power to the semiconductor laser driving means on the basis of a monitor value of the erase power monitor means; and a peak power setting means for setting a peak power which is a maximum power outputted by the semiconductor laser at recording of pits into the optical disk to the semiconductor laser driving means, by operating a monitor value of the erase power monitor means.

According to Claim 1 of the present invention, the laser control apparatus is constructed as above, and therefore detects a power at reproduction just before recording and operates a bias power, and, as for an erase power, detects the power by a sample-hold and operates a peak power on the basis of the detected value of the erase power, and even if a low speed monitor photodiode and a low speed monitor circuit are employed, since the time when the erase power is being outputted is relatively long, the erase power can be correctly detected by the sample-hold and therefore the stable power control can be realized even at the high-speed modulation.

As described above, since the time when an erase power is being outputted is relatively long, the erase power can be detected correctly by a sample-hold, and by utilizing this, a laser control apparatus can realize the power control stably even at the high-speed modulation, even when a low speed monitor photodiode and a low speed monitor circuit are employed.

According to Claim 2 of the present invention, there is provided a laser control apparatus which controls a power of a semiconductor laser in an optical recording/reproducing apparatus for performing recording/reproduction into/from an optical disk by a semiconductor laser, comprising: a photodiode for detecting a light of the semiconductor laser; a current/voltage conversion means for converting a current of the photodiode to a voltage and outputting the voltage; a reference voltage source for deciding a reproduction power of the semiconductor laser; an error detection means for detecting an error between the voltage outputted by the current/voltage conversion means and the reference voltage; a current source for passing a current through the semiconductor laser; a reproduction power control system for connecting an output of the error detection means to the current source, and controlling the reproduction power of the semiconductor laser; a bias current setting means for deciding a bias current to be passed through the semiconductor laser; a switch means for selectively switching between an output of the error detection means and an output of the bias current setting means, and at the reproduction, connecting an output of the error detection means to the current source to form the reproduction power control system and, at the recording, connecting an output of the bias current setting means, instead of the output of the error detection means, to the current source; a sample-hold means for sample-holding the output voltage of the current/voltage conversion means at the recording; an erase current setting means for deciding an erase current to be passed through the semiconductor laser; a peak current setting means for deciding a peak current to be passed through the semiconductor laser; and an operation means for operating set values of the erase current setting means and the peak current setting means on the basis of an output value of the sample-hold means.

According to Claim 2 of the present invention, the laser control apparatus is constructed as above, and therefore controls a bias power with using an automatic power control (Automatic Power Control; hereinafter, referred to as APC) value at reproduction just before recording, and, as for an erase power, detects the power by the sample-hold and subjects the power to APC directly, and controls a peak power on the basis of the control value of the erase power, and, even when a low speed monitor photodiode and a low speed monitor circuit are employed, since the time when the erase power is being outputted is relatively long, the erase power can be correctly detected by the sample-hold, and therefore the power control can be realized stably even at the high-speed modulation.

As described above, a bias power is controlled by using an APC control value at the reproduction just before recording, an erase power is controlled by the power being detected by the sample-hold, and a peak power is controlled on the basis of the control value of the erase power, and thereby a laser control apparatus which can realize power control stably even at the high-speed modulation can be provided even when a low speed monitor photodiode and a low speed monitor circuit are employed.

According to Claim 3 of the present invention, there is provided a laser control apparatus which controls a power of a semiconductor laser in an optical recording/reproducing apparatus for performing recording/reproduction into/from an optical recording medium by a semiconductor laser, comprising: a semiconductor laser power monitor means for monitoring an output of the semiconductor laser; an output error detection means for detecting an error between an output power reference value which is to be outputted by the semiconductor laser at reproduction just before recording and an actual output power value at the reproduction, which value is detected by the semiconductor laser power monitor means; a semiconductor laser power control means for setting an output power target value to a semiconductor laser driving means on the basis of a detected result of the output error detection means; and an output power target value correction means for correcting the output power target value on the basis of a monitor value of an output of the semiconductor laser driving means after the output power target value is set.

According to Claim 3 of the present invention, the laser control apparatus is constructed as above. Thereby, it obtains an error between an actual output and an output reference value of a semiconductor laser when the state is changed from the reproduction state into the recording state, and sets, in accordance with the error, an output power target value to the semiconductor laser driving means, and monitors the output of the semiconductor laser driving means so as to correct the output power target value. Therefore, it is possible to set a bias power appropriately in accordance with a reproduction power as a reference.

As described above, the laser control apparatus which can appropriately set a bias power in accordance with a reproduction power as a reference can be obtained.

According to Claim 4 of the present invention, there is provided a laser control apparatus which controls a power of a semiconductor laser in an optical recording/reproducing apparatus for performing recording/reproduction into/from an optical disk by a semiconductor laser, comprising: a photodiode for detecting a light of the semiconductor laser; a current/voltage conversion circuit for converting a current of the photodiode to a voltage, and outputting the voltage; a reference voltage source for deciding a reproduction power of the semiconductor laser; an error amplifier for amplifying a difference between the voltage outputted by the current/voltage conversion circuit and the reference voltage; a current source for passing a current through the semiconductor laser; a reproduction power control system for connecting an output of the error amplifier to the current source, to control the reproduction power; a D/A conversion circuit for deciding a current to be passed through the semiconductor laser; a switch means for selectively switching between an output of the error amplifier and an output of the D/A conversion circuit, to make a control signal of the current source; and an A/D conversion circuit for selecting one of an output voltage of the error amplifier and an output voltage of the D/A conversion circuit, and subjecting the voltages to digital conversion, in which a digital value of the D/A conversion circuit is decided on the basis of a digital value of the A/D conversion circuit, and at the recording, the output of the error amplifier is switched over to the output of the D/A conversion circuit and the current of the current source is controlled.

According to Claim 4 of the present invention, the laser control apparatus comprises: a reproduction power APC system for controlling the reproduction power to make the power constant at the reproduction; an A/D converter for detecting a current control voltage at reproduction; a D/A converter for controlling a bias current at the recording; a switch circuit for switching the control to switch over from a reproduction power APC system to D/A converter at the recording; and an operation circuit for operating the D/A value on the basis of the A/D conversion value, and makes a bias current value controlling a bias power equal to a reproduction current value controlling a reproduction power and can set the bias power to be equal to the reproduction power.

As described above, a laser control apparatus which can make a bias current value controlling a bias power equal to a reproduction current value controlling a reproduction power by detecting a reproduction current value and a bias power current value, and can set the bias power to be equal to the reproduction power, can be obtained.

According to Claim 5 of the present invention, there is provided a laser control apparatus which controls a power of a semiconductor laser in an optical recording/reproducing apparatus for performing recording/reproduction into/from an optical disk by a semiconductor laser, comprising: a photodiode for detecting a light of the semiconductor laser; a current/voltage conversion circuit for converting a current of the photodiode to a voltage, and outputting the voltage; a reference voltage source for deciding a reproduction power of the semiconductor laser; an error amplifier for amplifying a difference between the output voltage of the current/voltage conversion circuit and the reference voltage; a current source for passing a current through the semiconductor laser; a D/A conversion circuit for deciding a current to be passed through the semiconductor laser; a switch means for selectively switching a control signal of the current source to switch between an output of the error amplifier and an output of the D/A conversion circuit; an A/D conversion circuit for subjecting an analog signal outputted from the current/voltage conversion circuit to digital conversion, and outputting the converted signal; and an operation circuit for, in a period during which recording is not performed, outputting a digital signal to the D/A conversion circuit, reading changes in the output signal of the A/D conversion circuit, obtaining a change amount in power in response to a change amount in the current of the semiconductor laser, and at the recording, outputting the digital signal value obtained above to the D/A conversion circuit.

According to Claim 5 of the present invention, the laser control apparatus comprises: a reproduction power APC system for controlling a reproduction power to make the power constant at the reproduction; an A/D converter for detecting a current control voltage at the reproduction; a D/A converter for controlling a bias current at the recording; a switch circuit for switching the control to switch over from the reproduction power APC system to the D/A converter at the recording; and an operation circuit for operating the D/A value on the basis of the A/D conversion value, and decides a bias current value to control a bias power with using a reproduction current value to control a reproduction power and can set the bias power freely.

As described above, a laser control apparatus which can obtain a bias power corresponding to a bias power current value previously, and can set the bias power freely, can be provided.

According to Claim 6 of the present invention, there is provided a laser control apparatus which controls a power of a semiconductor laser in an optical recording/reproducing apparatus for performing recording/reproduction into/from an optical disk by a semiconductor laser, comprising: a photodiode for detecting a light of the semiconductor laser; a current/voltage conversion circuit for converting a current of the photodiode into a voltage, and outputting the voltage; a reference voltage source for deciding a reproduction power of the semiconductor laser; an error amplifier for amplifying a difference between the output voltage of the current/voltage conversion circuit and the reference voltage; a current source for passing a current through the semiconductor laser; a reproduction power control system for connecting an output of the error amplifier to the current source, and controlling the reproduction power; a D/A conversion circuit for deciding a current to be passed through the semiconductor laser; a switch means for selectively switching between the output of the error amplifier and an output of the D/A conversion circuit, to make a control signal of the current source; an A/D conversion circuit for subjecting the output of the error amplifier to digital conversion; and an operation circuit for, in a period during which recording is not performed, outputting a digital signal to the D/A conversion circuit, reading changes in an output signal of the A/D conversion circuit, obtaining a change amount in power in respect to a change amount in the current of the semiconductor laser, and at the recording, outputting a digital signal value obtained in the period during which the recording is not performed, to the D/A conversion circuit.

According to Claim 6 of the present invention, the laser control apparatus takes a correction between an A/D converter detecting a current control voltage at the reproduction and a D/A converter controlling a bias current at the recording, and even when full scales are different or offsets are present between the A/D converter and the D/A converter, the bias power can be set highly precisely.

As described above, a laser control apparatus which, by taking a correction between an A/D converter detecting a current control voltage at the reproduction and a D/A converter controlling a bias current at the recording, can set a bias power highly precisely even when full scales are different or offset are present between the A/D converter and the D/A converter, can be provided.

According to claim 7 of the present invention, there is provided a laser control apparatus which controls a power of a semiconductor laser in an optical recording/reproducing apparatus for performing recording/reproduction into/from an optical recording medium by a semiconductor laser, comprising: a semiconductor laser power monitor means for monitoring an output of the semiconductor laser; an output error detection means for detecting an error between an output power reference value to be outputted by the semiconductor laser at reproduction just before recording and an actual output power value at the reproduction, which value is detected by the semiconductor laser power monitor means; a semiconductor laser power control means for setting an output power target value to a semiconductor laser driving means on the basis of the detected result of the output error detection means; a switch means for making a state between the semiconductor laser power monitor means and the output error detection means OFF at the recording, and making the state ON at the reproduction; and an output error setting means for setting the output of the output error detection means so as to be equal to the output power reference value at the recording.

According to Claim 7 of the present invention, the laser control apparatus is constructed as above. Thereby, it obtains an error between an actual output and an output reference value of the semiconductor laser when the state is changed from the reproduction state into the recording state, and, when an output power target value is set to the semiconductor laser driving means in accordance with the error, it sets the output error to be equal to the output power reference value without transmitting the monitor result of the semiconductor laser power monitor means to the output error detection means at the recording. Therefore, it is possible to avoid a transient response at switching from the recording state to the reproduction state.

As described above, a laser control apparatus which can avoid transient response when the state is switched from the recording state to the reproduction state, can be obtained.

According to Claim 8 of the present invention, there is provided a laser control apparatus which controls a power of a semiconductor laser in an optical recording/reproducing apparatus for performing recording/reproduction into/from an optical disk by a semiconductor laser, comprising: a photodiode for detecting a light of the semiconductor laser; a current/voltage conversion circuit for converting a current of the photodiode to a voltage, and outputting the voltage; a reference voltage source for deciding a reproduction power of the semiconductor laser; an error amplifier for amplifying a difference between the output voltage of the current/voltage conversion circuit and the reference voltage; a current source for passing a current through the semiconductor laser; a reproduction power control system for connecting an output of the error amplifier to the current source, and controlling the reproduction power; a D/A conversion circuit for deciding a current to be passed through the semiconductor laser; a switch means for selectively switching a control signal of the current source to switch between the output of the error amplifier and an output of the D/A conversion circuit; and a switch means for cutting off an input from the current/voltage conversion circuit into the error amplifier, in which at the recording, switching from the output of the error amplifier to the output of the D/A conversion circuit is performed to control the current of the current source, as well as the input from the current/voltage conversion circuit into the error amplifier is cut off, and at the reproduction, switching from the output of the D/A conversion circuit to the output of the error amplifier is performed to control the current of the current source, as well as the output of the current/voltage conversion circuit is connected to the input to the error amplifier, and the voltages of the reference voltage source, which decide the reproduction power, have different values at the recording and at the reproduction and, when switching from recording to reproduction is performed, the voltage of the reference voltage source is changed passing through at least one intermediate value.

According to Claim 8 of the present invention, a laser control apparatus which, being provided with a means for cutting off an input to a servo amplifier from a monitor circuit at the recording, and a means which can change a reference voltage of reproduction APC at switching from the recording state to the reproducing state, changes the reference voltage of the reproduction APC successively when the recording is switched to the reproducing, thereby to avoid the occurrence of an unusual output light according to transient response of the reproduction APC.

As described above, a laser control apparatus which, when the recording is switched to the reproducing, can change a reference voltage of reproduction APC successively, thereby to avoid the occurrence of an unusual output light according to transient response of the reproduction APC, can be provided.

BEST MODE TO EXECUTE THE INVENTION (Embodiment 1)

Hereinafter, a laser control apparatus according to embodiments of the present invention will be described.

This first embodiment corresponds to the inventions as described in Claim 1 and Claim 2 of the present invention and a bottom power is controlled by using an APC value at the reproduction just before recording and, as for an erase power, since its period is relatively long, the power is detected by a sample-hold to be directly subjected to the APC control and a peak power is controlled on the basis of the control value of the erase power.

Figure 1:
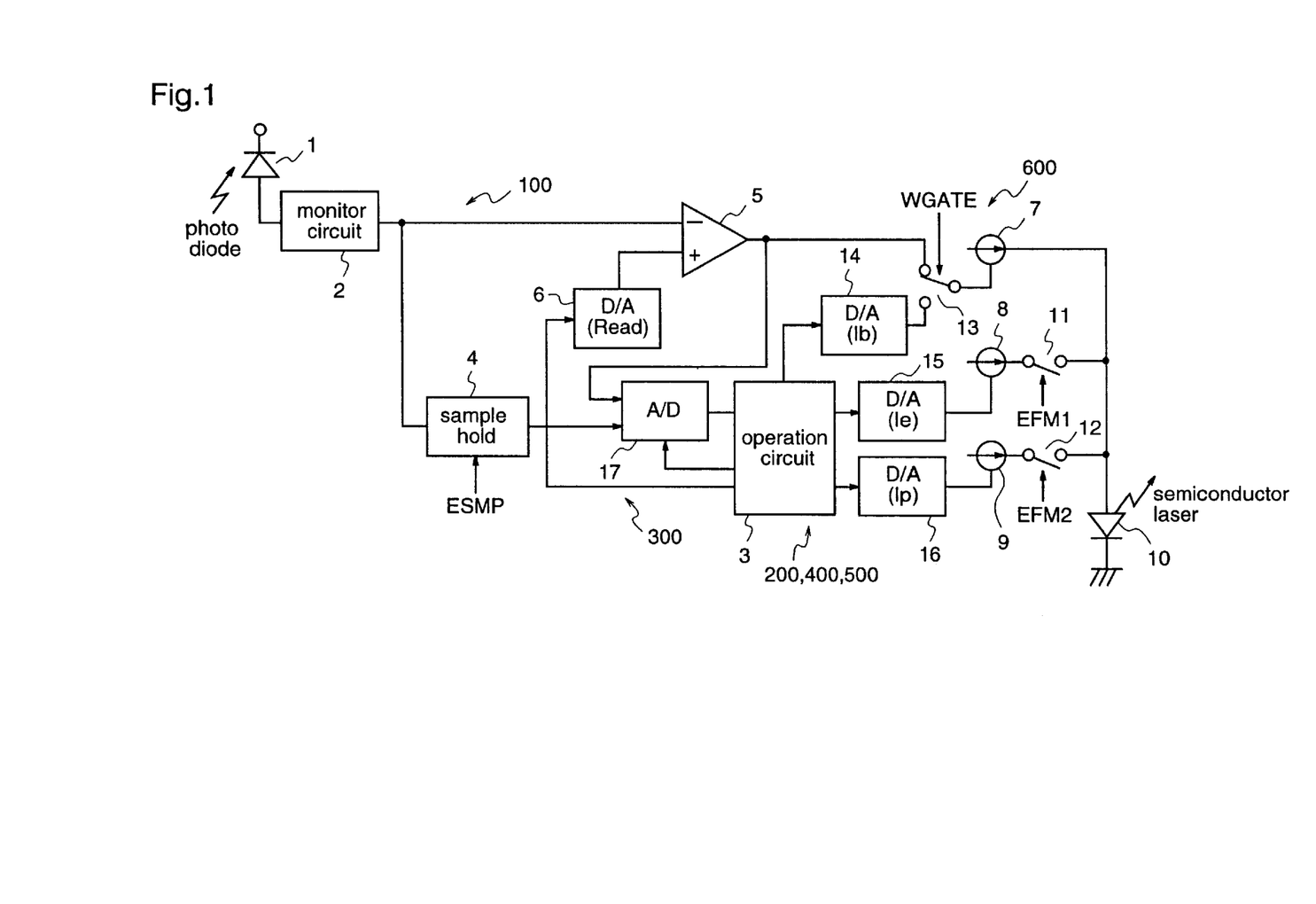
FIG. 1 is a block diagram of a laser control apparatus according to a first embodiment of the present invention.

FIG. 1 illustrates a laser control apparatus according to the first embodiment of the present invention. In FIG. 1, numeral 10 denotes a semiconductor laser for radiating laser light to an optical disk; numeral 1 denotes a photodiode for receiving the irradiation light of the semiconductor laser 10; numeral 2 denotes a monitor circuit (a current/voltage conversion means, a current/voltage conversion circuit) for monitoring the output of the photodiode 1; numeral 4 denotes a sample-hold circuit (a sample-hold means) for sample-holding the output of the monitor circuit 2; numeral 17 denotes an A/D converter (an A/D conversion circuit) for subjecting the output of the sample-hold circuit 4 or the output of the servo amplifier 5 to be described later to A/D conversion; numeral 3 denotes an operation circuit (an operation means) for operating the output of the A/D converter 17; numeral 6 denotes a D/A converter (a reference voltage source) for subjecting the output of the operation circuit 3 to D/A conversion; numeral 5 denotes a servo amplifier (an error detection means, an error amplifier) for comparing the output of the D/A converter 6 with the output of the monitor circuit 2 to amplify the error; numeral 14 denotes a D/A converter (a bias current setting means) for subjecting the output of the operation circuit 3 to D/A conversion; numeral 13 denotes a switch means (a switching means) for switching between the output of the servo amplifier 5 and the output of the D/A converter 14; numeral 7 denotes a current source which is controlled by the output of the switch means 13; numeral 15 denotes a D/A converter (an erase current setting means) for subjecting the output of the operation circuit 3 to D/A conversion; numeral 16 denotes a D/A converter (a peak current setting means) for subjecting the output of the operation circuit 3 to D/A conversion; numerals 8 and 9 denote current sources which are controlled by the outputs of the D/A converters 15 and 16; numerals 11 denotes a switch means for disconnecting the current source 8 with the semiconductor laser 10; and numeral 12 denotes a switch means for disconnecting the current source 9 with the semiconductor laser 10.

Further, a reproduction power-control system which stabilizes the output of the semiconductor laser 10 constant at the reproduction for making the output constant is constructed by: the semiconductor laser 10; the photodiode 1; the monitor circuit 2; the servo amplifier 5; the D/A converter 6; the operation circuit 3; the switch means 13; and the current source 7.

In addition, the reproduction power monitor means 100 which monitors the output of the semiconductor laser at the reproduction just before recording is constructed by: the photodiode 1; the monitor circuit 2; the servo amplifier 5; the D/A converter 6; the operation circuit 3, and the A/D converter 17.

Further, the bias power setting means 200 which sets a bias power which is the minimum power outputted by the semiconductor laser at the recording of pits into an optical recording medium to a semiconductor laser driving means on the basis of the monitor value of the reproduction power monitor means 100, the erase power setting means 400 which sets an erase power to the semiconductor laser driving means on the basis of the monitor value of the erase power monitor means 300, and the peak power setting means 500 which, with operating the monitor value of the erase power monitor means 300, sets a peak power which is the maximum power outputted by the semiconductor laser at the recording of pits into an optical recording medium to the semiconductor laser driving means 600 are constructed by the operation circuit 3.

In addition, the erase power monitor means 300 which monitors, by a sample-hold, an erase power which is a power outputted by the semiconductor laser at erasing of the optical recording medium between pits is constructed by the monitor circuit 2, the sample-hold circuit 4, and the A/D converter 17.

Further, a semiconductor laser driving means 600 which drives the semiconductor laser 10 is constructed by: the D/A converter 14; the switch means 13; the current source 7; the D/A converter 15; the current source 8; the switch means 11; the D/A converter 16; the current source 9; and the switch means 12.

Next, the operation will be described. The portion of the output light from the semiconductor laser 10 is received by the photodiode 1 and the generated photoelectric current is converted to a voltage in the monitor circuit 2.

When a reproduction from an optical disk is performed, a reproduction power reference voltage VR which is set by the operation circuit 3 and outputted from the D/A (Read) converter 6 and the voltage from the monitor circuit 2 are compared by the servo amplifier 5, and thereby a reproduction current control signal is outputted. A switch means 13 is switched by a WGATE signal showing a state of recording/reproduction, and at the reproduction from an optical disk, the reproduction current control signal is supplied to the current source 7, and the current source 7 flows a current through the semiconductor laser 10 so that a reproduction power PR corresponding to a reproduction power reference voltage VR is constantly outputted.

On the other hand, at the recording into an optical disk, the power of the semiconductor laser 10, as shown in FIG. 2, are modulated into three values of bias power PB, erase power PE and peak power PP to be incident on the optical disk. The bias power PB is controlled only by a bias power current Ib, the erase power PE is controlled by the value obtained by adding the bias power current Ib and the erase power current Ie, and the peak power PP is controlled by the value obtained by adding the bias power current Ib, the erase power current Ie and the peak power current Ip, respectively. The modulation of the semiconductor laser 10 is performed by turning on or off an addition of the erase power current Ie to the bias power current Ib by the switch means 11 which is switched by data EFM1, and also performed by turning on or off a further addition of the peak power current Ip, by the switch means 12 which is switched by data EFM2.

By the switch means 13 which is switched by the WGATE signal showing a state of recording/reproduction, at the recording, the output of the D/A(Ib) converter 14 is supplied to the current source 7 to control the bias power current Ib. The erase power current Ie is supplied by the current source 8 which is controlled by the D/A(Ie) converter 15. The peak power current Ip is supplied by the current source 9 which is controlled by the D/A(Ip) converter 16. At the recording, the semiconductor laser 10 is modulated, and the signal corresponding to the optical output is outputted from the monitor circuit 2 and the erase levels are detected by the sample-hold circuit 4 and the A/D converter 17.

FIG. 3 show aspects of the optical output waveform of the semiconductor laser 10, the output waveform of the monitor circuit 2 and the waveform of sample-hold control signal. At the intervals at which pits are formed in an optical disk, by data EFM1 and EFM2, the semiconductor laser is modulated with a pulse shape which oscillates between a peak power and a bias power at rather short intervals of time. On the other hand, a constant erase power PE is outputted to erase a pit in a space interval between pits. While the laser is modulated at high speed and the optical output waveform is made a high-speed square-wave, delays and unsharpening of signals occur in the photodiode 1 and the monitor circuit 2, thereby the output waveform of monitor circuit 2 includes unsharpening, the waveform does not reach the levels of the peak power and the bottom power. At the interval where pits are formed, thereby the optical output waveform cannot be reflected correctly. At the interval where the erasing is performed, because it is temporally long, the waveform reaches the level of the erase power even when the unsharpening occurs in the output waveform of the monitor circuit 2. And accordingly, as shown in FIG. 3, a sample-hold control signal ESPM which rises at the point when a predetermined time passes after the monitor output waveform becomes constant and falls at the point when the waveform becomes larger than the constant level, is generated, and the level of the erase power PE can be detected by performing a sample-hold employing the signal.

The sample-hold level of the erase power is converted to a digital value by the A/D converter 17 and the operation circuit 3 performs the process of operation on the digital value. The operation circuit 3 sets the digital values respectively to the D/A(Ie) converter 14, the D/A(Ip) converter 15 and the D/A (Ib) converter 16, and therefore sets the bias power current Ib, the erase power current Ie and the peak power current Ip, thereby to control the bias power PB, the erase power PE and the peak power PP.

The D/A(Ib) converter 14, the D/A(Ie) converter 15, and the D/A(Ip) converter 16 are controlled as follows. Initially, just before entering the recording state, the operation of seeking (random-accessing) a pickup containing a semiconductor laser therein is performed, and the operation circuit 3 detects, by the A/D converter 17, the output of the servo amplifier 5 by the reproducing operation at the time when the seeking operation completed, and sets the D/A (Ib) converter 14 to have the same output voltage as the detected one. Thereby the bias power PB is set. In addition, the operation circuit 3 detects the level of the erase power PE outputted from the sample-hold circuit 4 by the A/D converter 17 and increases/decreases the output of the D/A(Ie) converter 15 so as to obtain the predetermined erase power PE. For example, as shown in FIG. 2, in case that it is desired to set the peak power to be twice the power of the erase power, when the same value as that of the D/A(Ie) converter 15 is set to the D/A(Ip) converter 16, Ip is equal to Ie, and accordingly PP=2×PE is obtained. More strictly, PB is not zero and the erase power current Ie with respect to the set value of the D/A (Ie) converter 15 is not generally equal to the peak power current Ip with respect to the set value of the D/A(Ip) converter 16, and therefore the set value of the D/A (Ip) converter 16 can be obtained according to the following operation.

That is, as shown in FIG. 2, the erase power current Ie is a current required for increasing the power only from the bias power PB to the erase power PE and the peak power current Ip is a current required for increasing the power only from the erase power PE to the peak power PP, and therefore, $$Ie:Ip=(PE-PB):(PP-PE)$$

$$Ip=(PP-PE)/(PE-PB)\times Ie$$

that is, the value which is (PP−PE)/(PE−PB) times the value of Ie can be calculated to be set to the D/A(Ip) converter 16.

By performing such control, a peak hold and a bottom hold are not required, and it is not necessary to use the high-priced parts which enable high-speed operation for the monitor photodiode 1 and the monitor circuit 2. In addition, in case that the recording speed is increased and the modulation speed of the laser is increased, the peak power PP, the erase power PE, and the bias power PB can be controlled into the predetermined powers.

(Embodiment 2)

Next, a second embodiment will be described with reference to FIG. 4. For the same structures as those of the above-mentioned first embodiment, the same numerals are used.

This second embodiment corresponds to the inventions as described in Claims 3,4,5 and 6 of the present invention, and it is possible to set the bias power to be equal to the reproduction power and to set the bias power freely or highly precisely.

Figure 4:
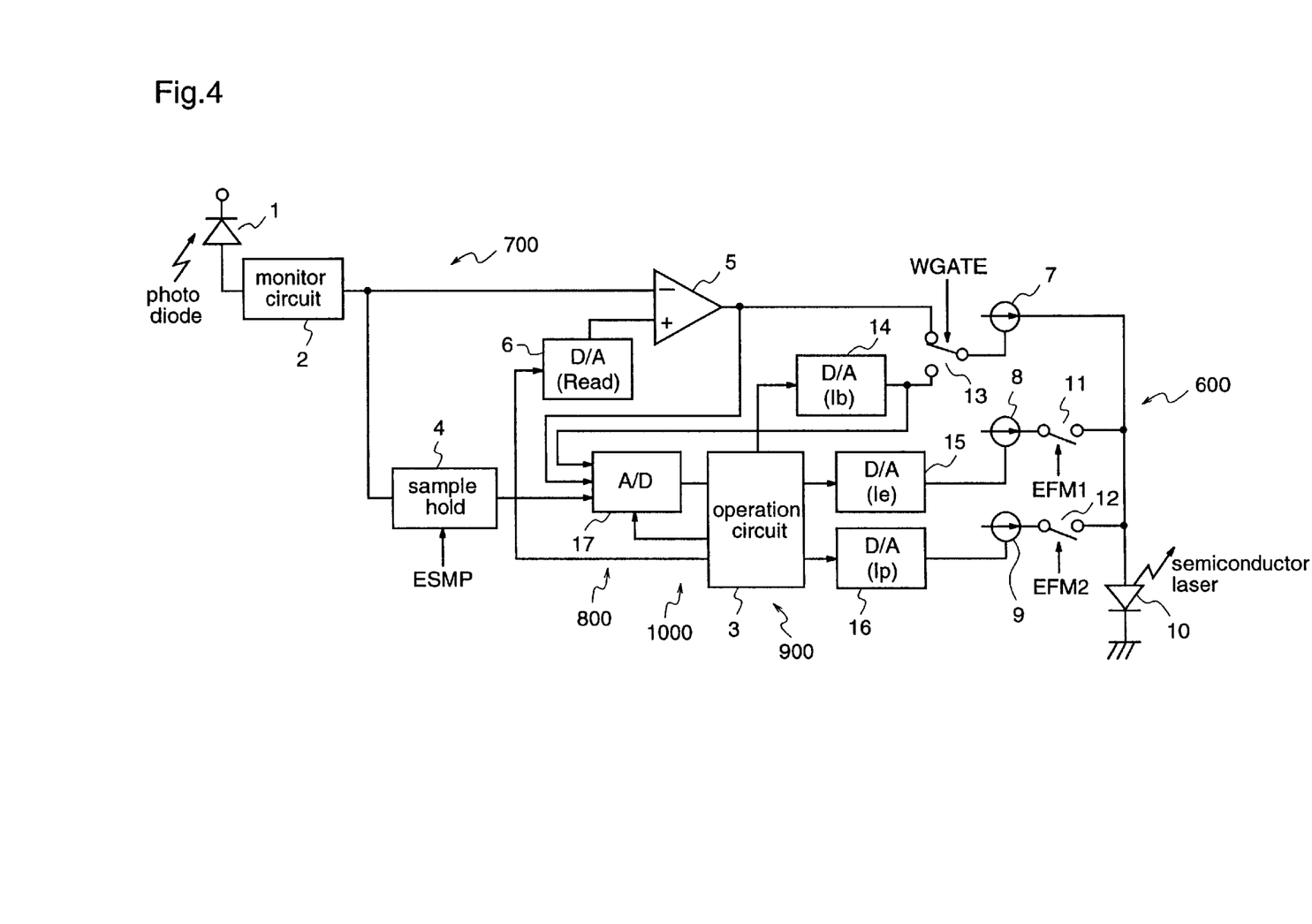
FIG. 4 is a block diagram of a laser control apparatus according to a second embodiment of the present invention.

FIG. 4 shows a laser control apparatus according to the second embodiment of the present invention. In FIG. 4, the same numerals as those of FIG. 1 show sections equal to or corresponding to those of FIG. 1. The semiconductor laser power monitor means 700 which monitors the output of the semiconductor laser 10 is constructed by the photodiode 1 and the monitor circuit 2.

In addition, the output error detection means 800 which detects the error between the output power reference value which is to be outputted by the semiconductor laser at the reproduction just before recording and the actual output power value at the reproduction, which value is detected by the semiconductor laser power monitor means 700 is constructed by the operation circuit 3, the D/A converter 6, the servo amplifier 5 and the A/D converter 17.

Further, the semiconductor laser power control means 900 which sets an output power target value to the semiconductor laser driving means 600 on the basis of the detected result of the output error detection means 800 is constructed by the operation circuit 3.

Further, the output power target value correction means 1000 which corrects an output power target value on the basis of the monitor value of the output of the semiconductor laser driving means after setting the output power target value is constructed by the A/D converter 17 and the operation circuit 3.

Next, the operation will be described. At the recording, by the switch means 13 which is switched by the WGATE signal showing a state of, recording/reproduction, the output of the D/A (Ib) converter 14 is supplied to the current source 7 to control the bias power current Ib, and the operation circuit 3 detects the output of the servo amplifier 5 just before entering the recording state by the A/D converter 17 and sets the D/A (Ib) converter 14 to have the same output voltage as the detected one.

The invention of Claim 4, in this second embodiment, corresponds to the invention in which the output of the D/A (Ib) converter 14 is input to the A/D converter 17 and the output voltage of the D/A (Ib) converter 14 can be detected. Then, before or after the state is switched to that of recording, the output of the servo amplifier 5 and the voltage of the D/A (Ib) converter 14 are detected and compared in the A/D converter 17 and the operation circuit 3, by correcting the set value of the D/A (Ib) converter 14 so as to make the above detected and compared values equal to each other, can correct the conversion error or the offset voltage of the D/A (Ib) converter 14 and makes the bias current value Ib due to the current source 7, which value controls the bias power PB, equal to the reproduction current value Ir to control the reproduction power PR, so the value of the bias power PB can be set at the most standard value of bias power, that is, the same value as that of the reproduction power PR.

Next, the invention of Claim 5, in this second embodiment, corresponds to the inventions in which, before recording operation at the rising of a drive (an optical recording/reproducing apparatus), and the like, the relation between the set value of the D/A (Ib) converter 14 and the bias power PB is previously obtained, and the output of the servo amplifier 5 is detected by the A/D converter 17 when the state is changed from the state of reproduction to the state of recording and the set value of the D/A (Ib) converter 14 is decided in accordance with the previously obtained relation between the set value of the D/A (Ib) converter 14 and the bias power PB.

To be more specific, when it is desired that the bias power PB is set to be lower in power than the reproduction power PR, for example in case that PB=PR×0.5 is desired, as described first in the second embodiment as that corresponding to the invention of Claim 3, initially, before the operation of recording, the operation circuit 3 controls the bias current Ib with using the D/A (Ib) converter 14, and sets the output power of the semiconductor laser 10 to have the same power as the reproduction power PR. Next, the operation circuit 3 decreases the set value of the D/A (Ib) converter 14, to detect the output of the monitor circuit 2 by the A/D converter 17 via the sample-hold circuit 4 and to obtain the set value of the D/A (Ib) converter 14 for the case of obtaining PB=PR× 0.5. Thereby, it can be obtained how much the current is to be smaller than the reproduction current value Ir to reduce the bias power by half and in the actual recording operation, the bias power current value Ib is constantly set to be smaller than the reproduction current value Ir by the previously obtained value, and therefore PB=PR×0.5 can be obtained. In obtaining the relation between the set value of the D/A (Ib) converter 14 and the bias power PB, the whole set values are not necessarily required to be obtained as in table and they can be obtained by being interpolated by one or plural points.

Figure 5A:
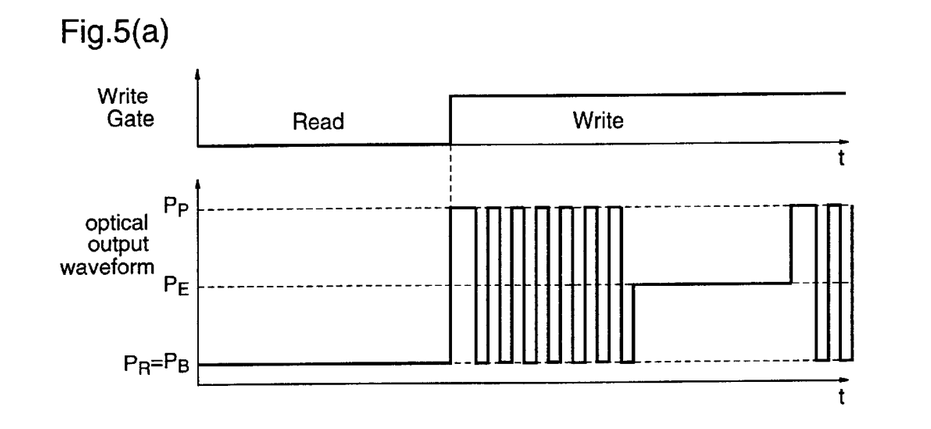
FIG. 5 are diagrams for explaining the power control according to the laser control apparatus according to the second embodiment of the present invention.
Figure 5B:
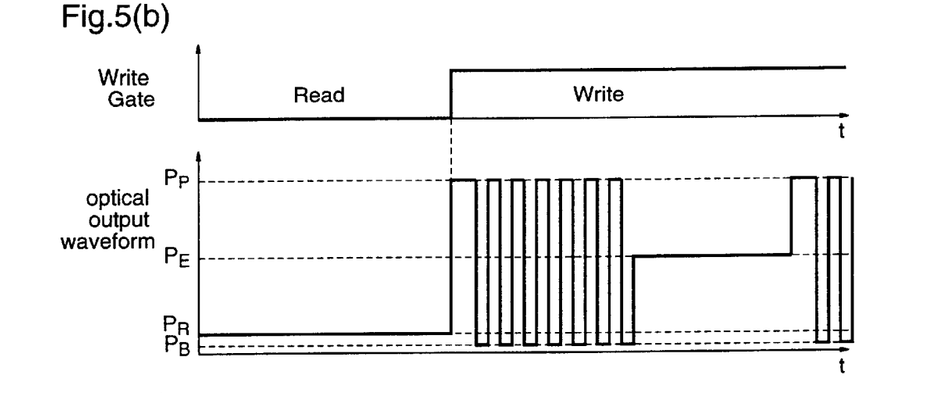
Figure 5C:
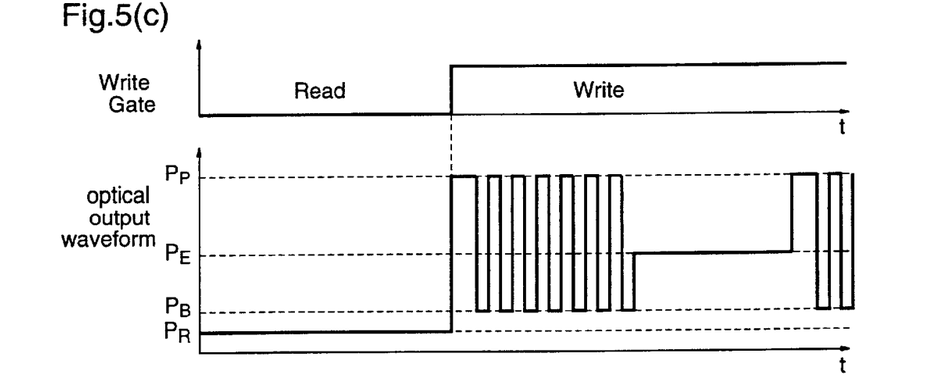

As described above, the relation between the set value of the D/A (Ib) converter 14 and the bias power PB is previously obtained, and therefore the output of the servo amplifier 5 is detected by the A/D converter 17 when the state is changed from the state of reproduction to the state of recording and the bias current value Ib to control the bias power PB can be added/subtracted to/from the reproduction current value Ir to control the reproduction power PR, so the bias power PB can be set freely. Accordingly, the optimum bias power PB can be set in accordance with the kinds of the optical disks. FIG. 5 show optical output waveforms in case of changing the bias power. FIG. 5(*a*) is for the case of setting the bias power PB=the reproduction power PR, FIG. 5(*b*) is for the case of setting the bias power PB<the reproduction power PR, and FIG. 5(*c*) is for the case of setting the bias power PB>the reproduction power PR, respectively.

Next, the invention of Claim 6, in this second embodiment, corresponds to the invention in which, before the recording operation at the rising of a drive and the like, the relation between the set value of the D/A (Ib) converter 14 and the converted value of the A/D converter 17 is previously obtained.

To be more specific, the operation circuit 3 detects the output of the servo amplifier 5 by the A/D converter 17 when the state is changed from the state of reproduction to the state of recording and decides the set value of the D/A (Ib) converter 14 in accordance with the previously obtained relation between the set value of the D//A (Ib) converter 14 and the converted value of the A/D converter 17. In obtaining the relation between the set value of the D/A (Ib) converter 14 and the converted value of the A/D converter 17, the whole set values are not necessarily required to be obtained as in table and they can be obtained by being interpolated by one or plural points.

As described above, the relation between the set value of the D/A (Ib) converter 14 and the converted value of the A/D converter 17 is previously obtained, and therefore, without detecting the output of the D/A (Ib) converter 14 every time by the A/D converter 17 when the state is changed from the state of reproduction to the state of recording, the bias power current value Ib to control the bias power PB can be set to be equal to the reproduction current value Ir to control the reproduction Power PR, and accordingly, even when the full scales are different between in the D/A (Ib) converter 14 and in the A/D converter 17 or the offset occurs therein, the bias power PB can be accurately set to have the same value as that of the reproduction power PR.

(Embodiment 3)

Next, a third embodiment will be described with reference to FIG. 6. For the same structures as those of the above-mentioned embodiments, the same numerals are used and the description will not be given.

This third embodiment corresponds to the inventions as described in Claims 7 and 8 of the present invention, and it is possible to prevent an unusual output light from being radiated according to transient response of the reproduction APC.

Figure 6:
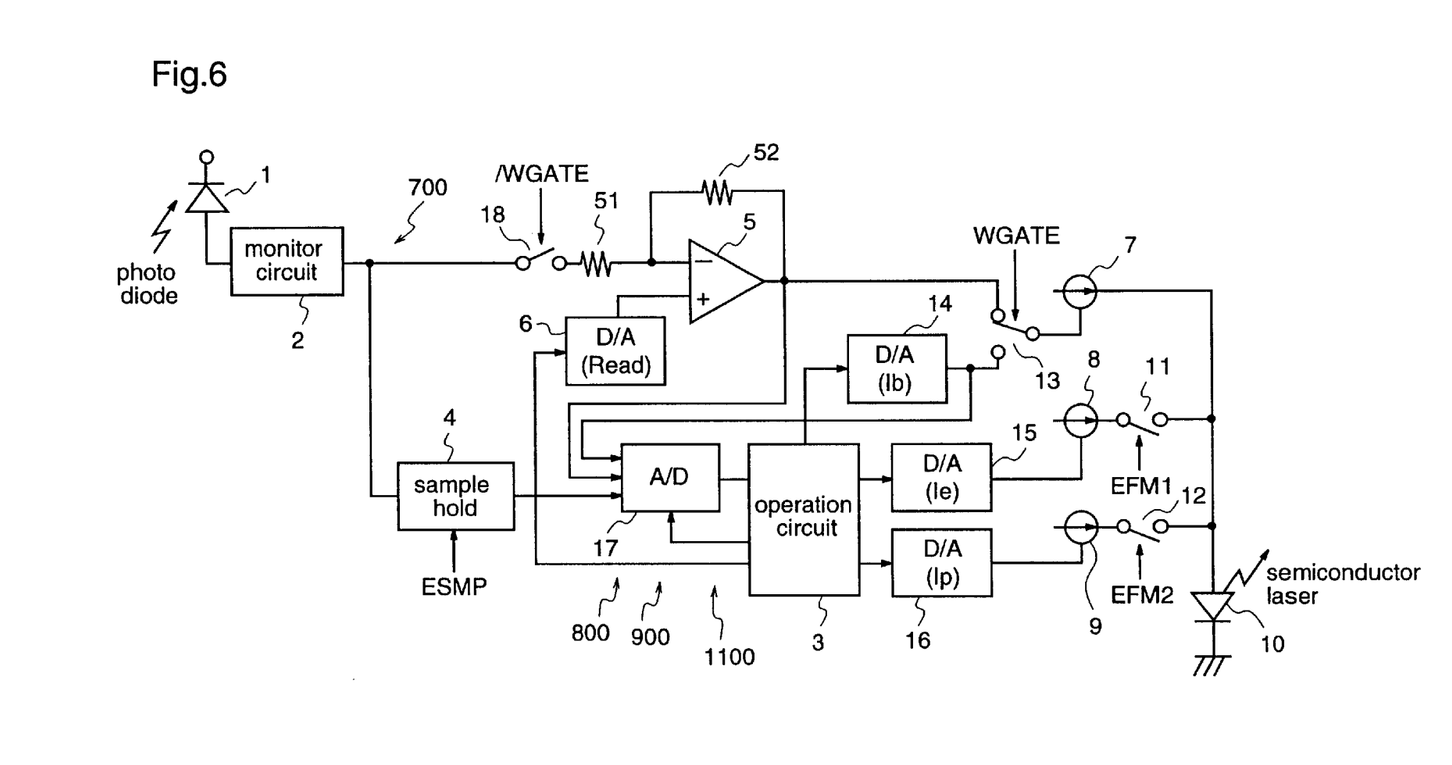
FIG. 6 is a block diagram of a laser control apparatus according to a third embodiment of the present invention.

FIG. 6 shows a laser control apparatus according to the third embodiment of the present invention. In FIG. 6, the same numerals as those of FIG. 4 show sections equal to or corresponding to those of FIG. 4. Numerals 51 and 52 denote resistors for using the servo amplifier 5 as a voltage follower amplifier, numeral 18 denotes a switch means for disconnecting the monitor circuit 2 with the resistor 51 of the servo amplifier 5, which means is turned on at the reproduction and turned off at the recording in accordance with/ WGATE signal showing a recording state or a reproducing state.

Further, the output error setting means 1100 which sets the output of the output error detection means 800 to be equal to the output power reference value at the recording is constructed by the operation circuit 3 and the D/A converter 6.

Figures 7A, 7B:
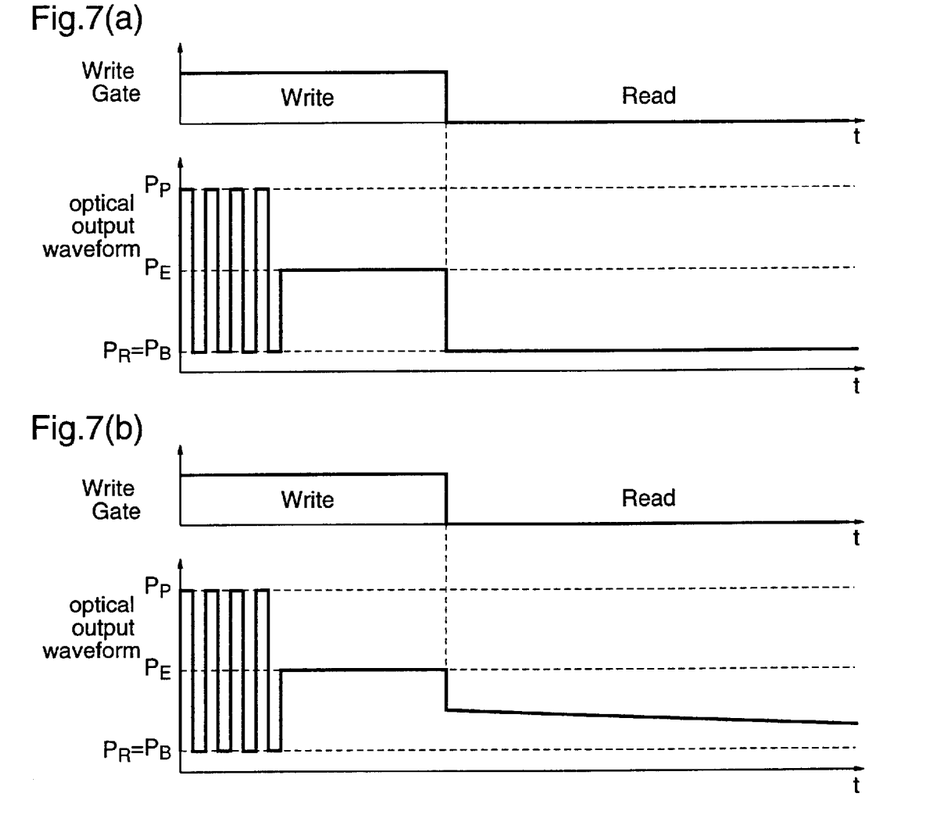
FIG. 7 are diagrams for explaining the power control according to the laser control apparatus according to the third embodiment of the present invention.
Figure 8:
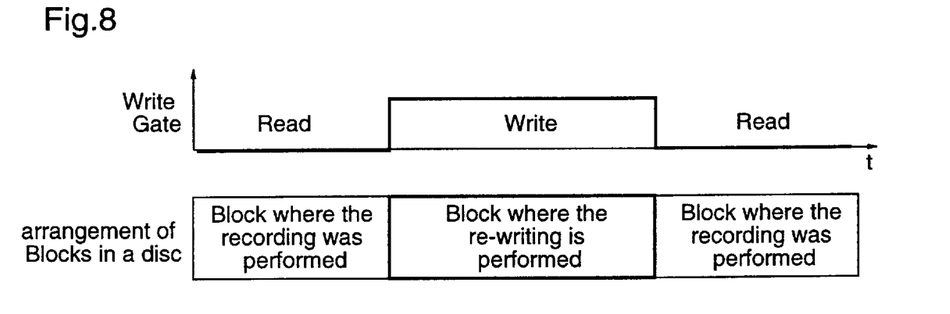
FIG. 8 is a diagram for explaining the power control according to the laser control apparatus according to the third embodiment of the present invention.

Next, the operation will be described. Assuming that there is no switch means 18 and the monitor circuit 2 is directly connected to the resistor 51 of the servo amplifier 5, the modulated waveform on the basis of the modulated light of a laser is input to the servo amplifier 5 from the monitor circuit 2 at the recording, and, as the gain is high and the band is narrow in the servo amplifier 5 generally, the output of the servo amplifier 5 is saturated to the side of + or to the side of −, and by the setting of D/A (Read) converter 6, the output voltage cannot be kept at the constant value. If the state in which the output is saturated to the side of + at the recording is switched to the reproducing state, as shown in FIG. 7, the large current flows just after the control signal of the current source 7 is switched to the output of the servo amplifier 5 by the switch means 13, and is finally settled as the reproduction power, but an unusual output light according to the transient response is radiated. There is no problem in an optical disk into which the recording is performed at every sector and in which gaps such as un-recorded regions exist among sectors. However, in an optical disk such as a CD-RW having no un-recorded regions among sectors, when the recording is performed into the region existing between the Blocks where the recording was already performed as shown in FIG. 8, there is such possibility that a Block just after the Block under re-writing may be erased if the reproduction power just after recording is large.

On the other hand, according to the third embodiment, when the switch means 18 is in the state of off at the recording, the servo amplifier 5 is in the state of the voltage follower, and the output voltage is equal to the voltage of the + input terminal, and the output voltage of the D/A (Read) converter 6 is output straight. And, during recording, the operation circuit 3 sets the output voltage of the D/A (Read) converter 6 to be equal to the output voltage of the D/A (Ib) converter 14 at the reproduction.

While, when the state changes from recording to reproducing, the control signal of the current source 7 is switched by the switch means 13, when setting is performed as described above, the control voltages of the current source 7 can be almost the same before and after the switching. Next, the switch means 18 is in the on state and a voltage on the basis of the optical output of the laser is input to the servo amplifier 5 from the monitor circuit 2, and because the band of the servo amplifier 5 is generally narrow, the output of the servo amplifier 5 does not change just after the switching. Here, the output voltage of the D/A(Read) converter 6 can be gradually changed to the reference level of the reproduction power PR to be transferred to the stationary state of the reproduction power control. In this way, the transient response at the switching can be minimized and an unusual output light according to transient response can be suppressed.

Applicability in Industry

As described above, the laser control apparatus according to the present invention is useful in being used for controlling the power of the semiconductor laser in the optical pick-up, which laser performs recording/reproduction into/ from an optical recording medium such as an optical disk. It is particularly suitable when used for controlling the optical power stably when the output light is modulated at high speed.

What is claimed is:

1. A laser control apparatus which controls a power of a semiconductor laser in an optical recording/reproducing apparatus for performing recording/reproduction into/from an optical recording medium by a semiconductor laser, comprising:

a reproduction power monitor means for monitoring an output of the semiconductor laser at reproduction just before recording;

a bias power setting means for setting a bias power which is a minimum power outputted by the semiconductor laser at recording of pits into the optical recording medium, to a semiconductor laser driving means on the basis of a monitor value of the reproduction power monitor means;

an erase power monitor means for monitoring an erase power which is a power outputted by the semiconductor laser at erasing between pits of the optical recording medium, by sample holding;

an erase power setting means for setting the erase power to the semiconductor laser driving means on the basis of a monitor value of the erase power monitor means; and     a peak power setting means for setting a peak power which is a maximum power outputted by the semiconductor laser at recording of pits into the optical recording medium to the semiconductor laser driving means, by operating a monitor value of the erase power monitor means.

2. A laser control apparatus which controls a power of a semiconductor laser in an optical recording/reproducing apparatus for performing recording/reproduction into/from an optical disk by a semiconductor laser, comprising:

a photodiode for detecting a light of the semiconductor laser;

a current/voltage conversion means for converting a current of the photodiode to a voltage and outputting the voltage;

a reference voltage source for deciding a reproduction power of the semiconductor laser;

an error detection means for detecting an error between the voltage outputted by the current/voltage conversion means and the reference voltage;

a current source for passing a current through the semiconductor laser;

a reproduction power control system for connecting an output of the error detection means to the current source, and controlling the reproduction power of the semiconductor laser;

a bias current setting means for deciding a bias current to be passed through the semiconductor laser;

a switch means for selectively switching between an output of the error detection means and an output of the bias current setting means, and at the reproduction, connecting an output of the error detection means to the current source to form the reproduction power control system and, at the recording, connecting an output of the bias current setting means, instead of the output of the error detection means, to the current source;

a sample-hold means for sample-holding the output voltage of the current/voltage conversion means at the recording;

an erase current setting means for deciding an erase current to be passed through the semiconductor laser;

a peak current setting means for deciding a peak current to be passed through the semiconductor laser; and an operation means for operating set values of the erase current setting means and the peak current setting means on the basis of an output value of the sample-hold means.

* * * * *